United States Patent
Tsuchiya

(10) Patent No.: US 7,673,473 B2
(45) Date of Patent: Mar. 9, 2010

(54) DEHUMIDIFICATION COOLING APPARATUS FOR AN INDOOR SPORTS FACILITY

(75) Inventor: Noriaki Tsuchiya, Hokkaido (JP)

(73) Assignee: Tsuchiya Dairy Equipment Manufacturing Co., Obihiro, Hokkaido (JP)

( * ) Notice: Subject to any disclaimer, the term of this patent is extended or adjusted under 35 U.S.C. 154(b) by 160 days.

(21) Appl. No.: 11/889,848

(22) Filed: Aug. 16, 2007

(65) Prior Publication Data

US 2008/0127658 A1 Jun. 5, 2008

(30) Foreign Application Priority Data

Dec. 4, 2006 (JP) ............... 2006-327477

(51) Int. Cl.
*F25D 17/08* (2006.01)

(52) U.S. Cl. ............... 62/434; 62/461; 62/462

(58) Field of Classification Search ............ 62/434, 62/461–462, 438, 420

See application file for complete search history.

(56) References Cited

U.S. PATENT DOCUMENTS 1,941,425 A * 12/1933 Young ............ 165/48.1
5,243,834 A * 9/1993 Hachinohe et al. ............ 62/434

FOREIGN PATENT DOCUMENTS

JP 03-030629 2/1991
JP 2001-193967 7/2001

OTHER PUBLICATIONS

NPL—McQuiston/Parker/Spitler; Heating, Ventilating, and Air conditioning Analysis and Design 6th Ed.; copyright 2005 John Wiley & Sons Inc; Fig. 1-6 on p. 11 and section 4-6 Methods to Control Humidity, p. 97 paragraph 2.*

* cited by examiner

*Primary Examiner*—William E. Tapolcai
*Assistant Examiner*—Lakiya Rogers
(74) *Attorney, Agent, or Firm*—Shlesinger, Arkwright & Garvey LLP

(57) ABSTRACT

A dehumidification cooling apparatus for an indoor sports facility is provided which is capable of realizing dehumidification and cooling at a low operating cost in the indoor sports facility. This apparatus includes: an ice chamber for turning water into ice and storing it; an air supply-and-exhaust pipe which is disposed from the ice chamber to the indoor sports facility, leads to the ice chamber and leads to the upper space of the indoor sports facility; a fan which is disposed in a supply pipe of the air supply-and-exhaust pipe; and a heater which is disposed in the supply pipe of the air supply-and-exhaust pipe. The fan supplies air cooled with the melting heat of ice made in the ice chamber, from the ice chamber through the supply pipe to the upper space of the indoor sports facility; the heater heats the air inside of the supply pipe, to reduce its humidity to a predetermined level; and through an exhaust pipe of the air supply-and-exhaust pipe, the air of the upper space of the indoor sports facility is returned for circulation to the ice chamber, so that dehumidification and cooling are conducted in the space of the indoor sports facility.

3 Claims, 4 Drawing Sheets

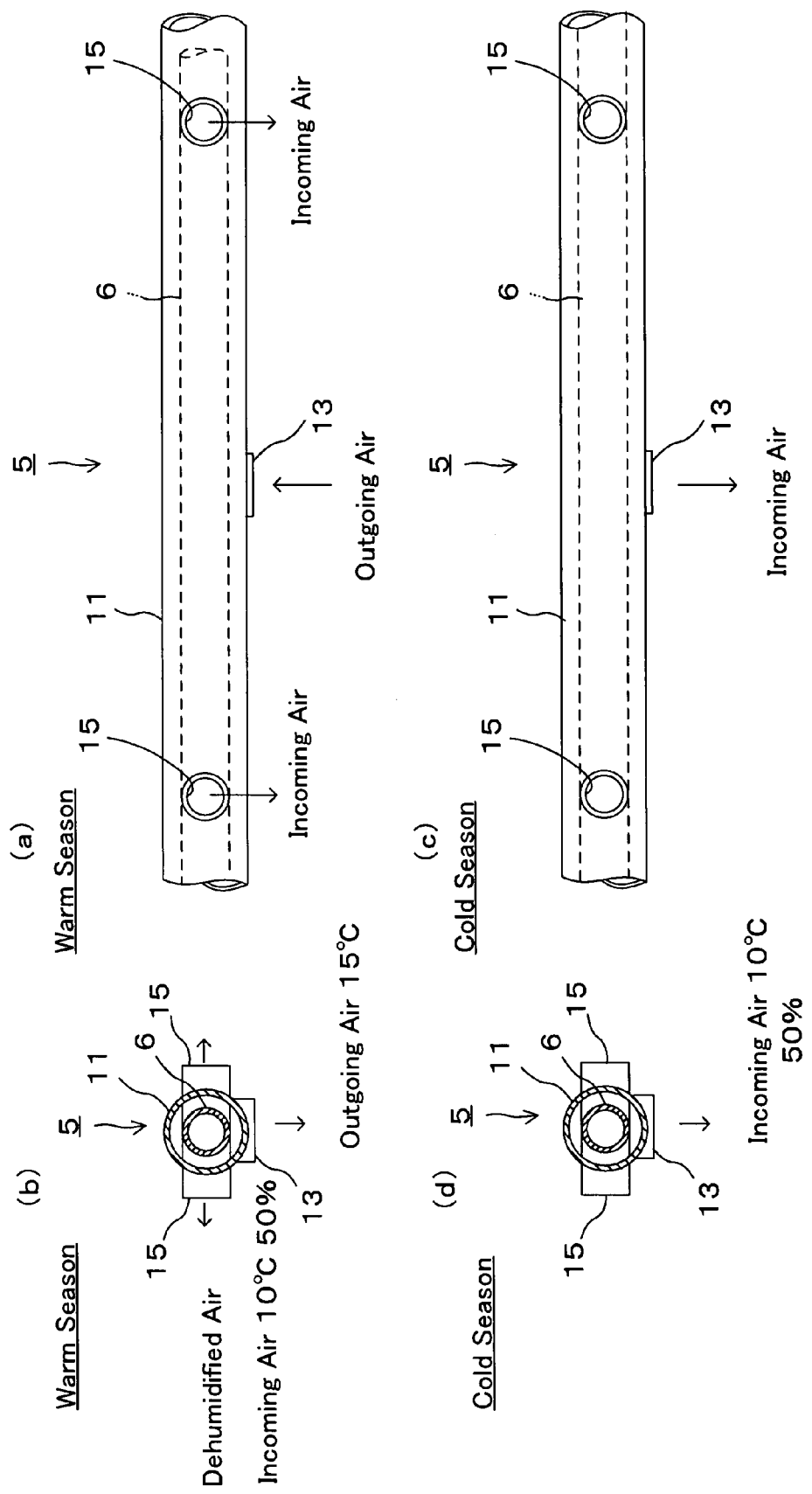

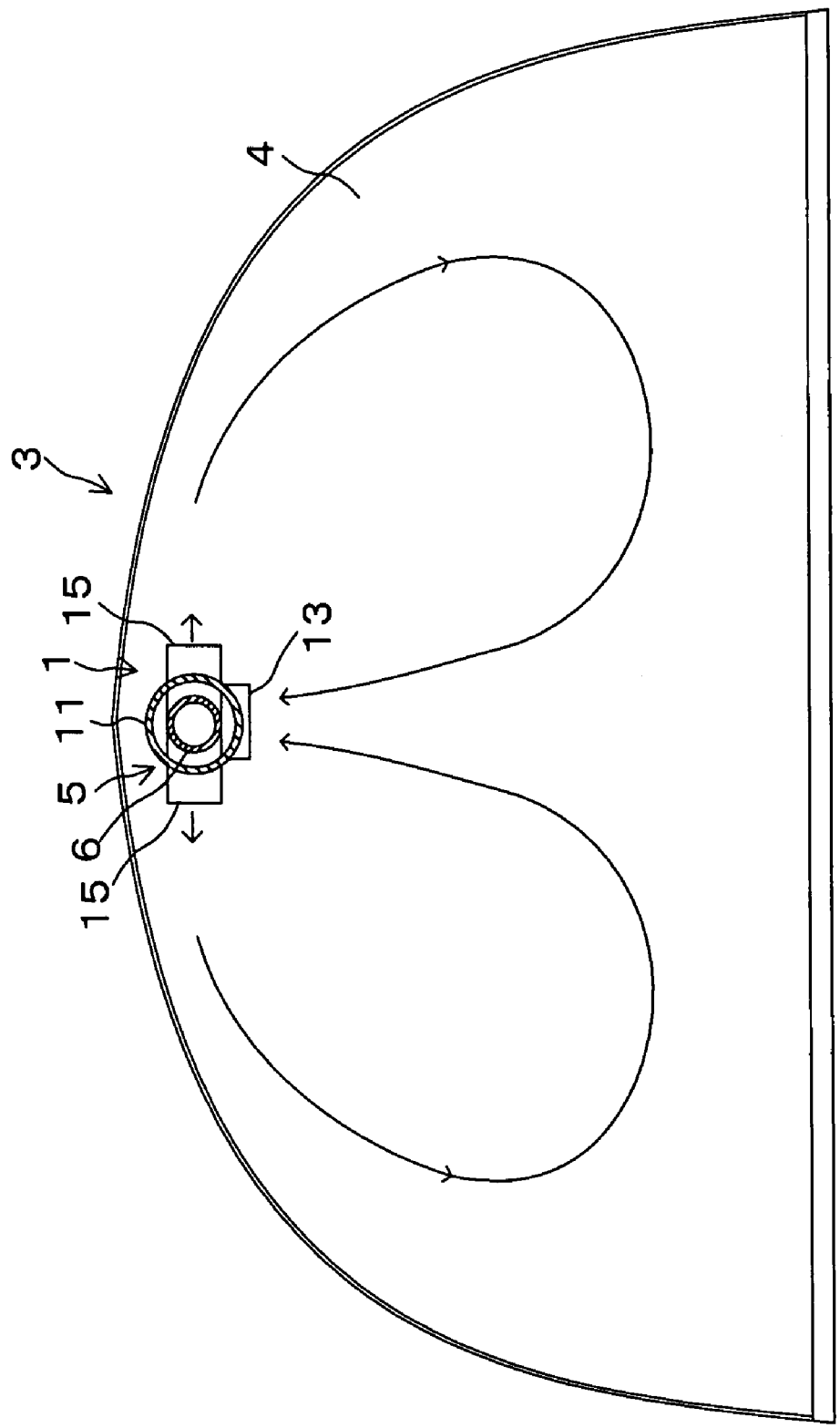

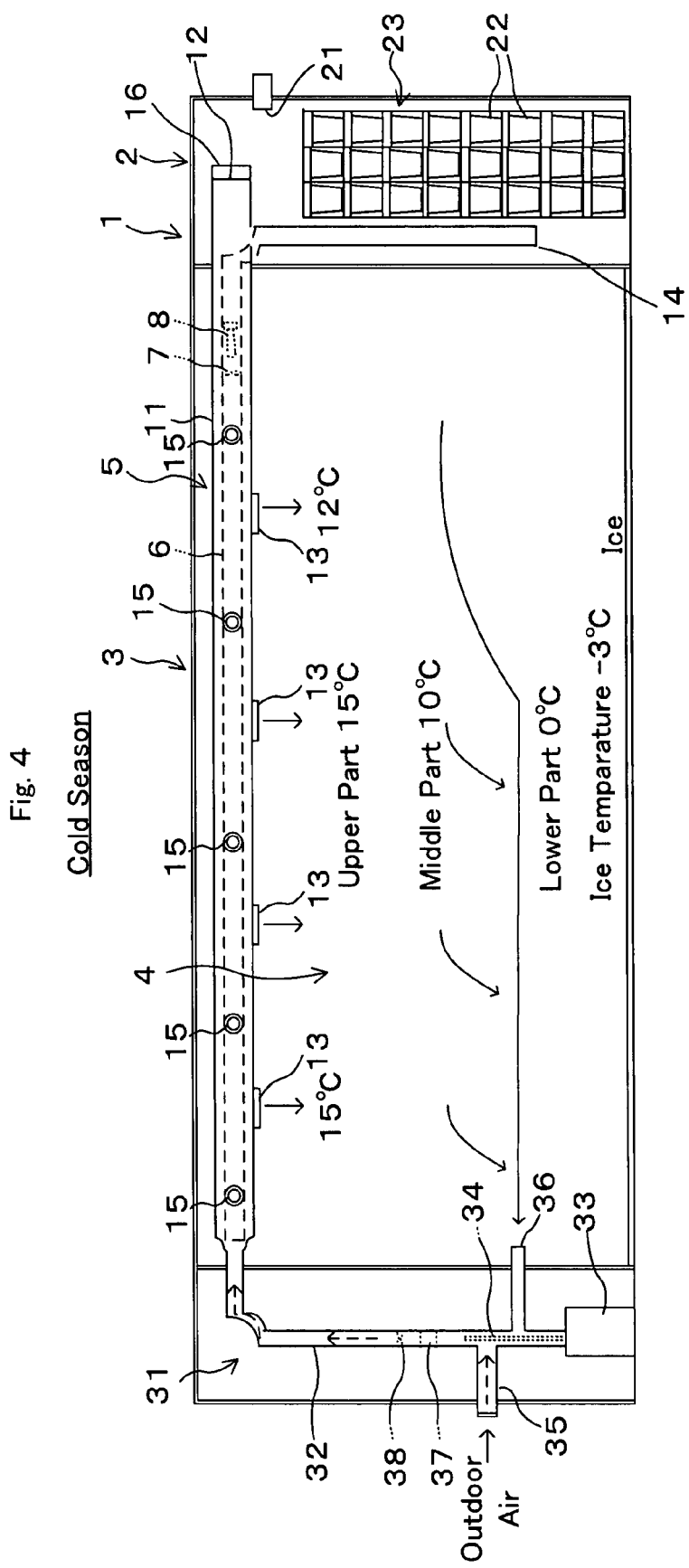
Fig. 4 Cold Season

DEHUMIDIFICATION COOLING APPARATUS FOR AN INDOOR SPORTS FACILITY

BACKGROUND OF THE INVENTION

1. Field of the Invention

The present invention relates to a dehumidification cooling apparatus for an indoor sports facility which is capable of realizing dehumidification and cooling at a low operating cost in a warm season in the indoor sports facility.

2. Description of the Background Art

In order to keep an indoor sports facility open in a constant condition through the four seasons or all year round, dehumidification, cooling and ventilation in a warm season (i.e., April to September) and humidification, heating and ventilation in a cold season (i.e., November to March) are indispensable.

For example, in an indoor curling rink or an indoor skating rink as the indoor sports facility, humidification, heating and ventilation in the cold season (i.e., November to March) can be easily conducted. However, dehumidification, cooling and ventilation in the warm season (i.e., April to September) require a high operating cost, thus making it difficult to keep such a facility open during this season. In practice, such facilities are mostly open only in winter.

In addition, in an indoor curling rink or the like, if there is a large crowd including players and spectators in the warm season, fog may form because of the difference between the ice temperature and the room temperature. Or, the difference between the indoor and outdoor temperatures may cause dew or frost to form. This raises a disadvantage in that an official curling competition which requires a homogeneous and delicate ice surface cannot be held.

In general, as methods of dehumidification, a cooling type, a compression type, a suction-adhesion type or an absorption type are known, but dehumidification costs become high in any such method. Hence, it is difficult to realize those methods in the indoor sports facility.

As an apparatus for realizing cooling and ventilation in a low-cost method in the warm season (i.e., April to September), for example, Patent Document 1 presents a method of storing fruit and vegetables for a long time using the latent heat of natural ice. Besides, Patent Document 2 offers a method of cooling and heating a building using the latent heat of natural ice.

Herein, Patent Document 1 is Japanese Patent Publication No. 4-55647 specification, and Patent Document 2 is Japanese Patent Laid-Open No. 2001-193967 specification.

As described earlier, dehumidification, cooling and ventilation in the warm season and humidification, heating and ventilation in the cold season are essential for keeping the indoor sports facility open in the same condition throughout the year.

Particularly, in an indoor curling rink or another such facility, dehumidification is imperative to prevent fog, dew or frost from forming.

However, in such an indoor sports facility, a disadvantage arises in that a high operating cost is necessary for dehumidification, cooling and ventilation in the warm season.

SUMMARY OF THE INVENTION

In view of the above described present situation, it is an object of the present invention to provide a dehumidification cooling apparatus for an indoor sports facility which is capable of realizing dehumidification and cooling at a low operating cost in the warm season in the indoor sports facility.

In order to resolve the above described disadvantages, the present invention offers the following configurations.

A dehumidification cooling apparatus for an indoor sports facility according to an aspect of the present invention, comprising: an ice chamber for turning water into ice and storing the ice; an air supply-and-exhaust pipe which is disposed from the ice chamber to the indoor sports facility, leads to the ice chamber and leads to an upper space of the indoor sports facility; a fan which is disposed in a supply pipe of the air supply-and-exhaust pipe; and a heater which is disposed at a predetermined distance apart from the fan in the supply pipe of the air supply-and-exhaust pipe, wherein: the fan supplies air cooled with the melting heat of ice made in the ice chamber, from the ice chamber through the supply pipe to the upper space of the indoor sports facility; the heater heats the air inside of the supply pipe to reduce its humidity to a predetermined level; and through an exhaust pipe of the air supply-and-exhaust pipe, the air of the upper space of the indoor sports facility is returned for circulation to the ice chamber, so that dehumidification and cooling are conducted in the space of the indoor sports facility.

A dehumidification cooling apparatus for an indoor sports facility according to another aspect of the present invention, wherein in the above described dehumidification cooling apparatus, the air supply-and-exhaust pipe is a double pipe which is made up of an internal pipe formed by the supply pipe and an external pipe formed by the exhaust pipe.

A dehumidification cooling apparatus for an indoor sports facility according to still another aspect of the present invention, wherein in the above described dehumidification cooling apparatus: the external pipe includes an opening portion which opens in an upper part of the ice chamber, and a plurality of opening portions which are disposed at a predetermined distance apart from each other in the upper space of the indoor sports facility; and the internal pipe includes an opening portion which penetrates the external pipe in the ice chamber, protrudes outward from the external pipe and opens in a lower part of the ice chamber, and a plurality of opening portions which penetrate the external pipe in the upper space of the indoor sports facility, protrudes outward from the external pipe and are disposed a predetermined distance apart from the opening portions of the external pipe.

A dehumidification cooling apparatus for an indoor sports facility according to still another aspect of the present invention, wherein in the above described dehumidification cooling apparatus: the opening portions of the external pipe disposed in the upper space of the indoor sports facility open downwardly; and the opening portions of the internal pipe disposed in the upper space of the indoor sports facility open horizontally.

A dehumidification cooling apparatus for an indoor sports facility according to still another aspect of the present invention, wherein in the above described dehumidification cooling apparatus, the ice chamber includes an outdoor-air intake which is freely opened and closed.

A dehumidification cooling apparatus for an indoor sports facility according to still another aspect of the present invention, wherein in the above described dehumidification cooling apparatus, the ice chamber includes a plurality of water tanks which store water, and a shelf for placing the plurality of water tanks in a plurality of tiers.

In the dehumidification cooling apparatus for an indoor sports facility according to an aspect of the present invention, air is supplied which has been cooled with the melting heat of ice made in the ice chamber. Therefore, cooling can be realized at a low operating cost in the warm season in the indoor sports facility. Besides, this supplied air is heated by the heater and falls to a predetermined humidity, so that dehumidification can be conducted at a moderate operating cost. Particularly, if this dehumidification cooling apparatus is applied for use in an indoor curling rink or the like, then fog, dew or frost can be prevented from forming.

In the dehumidification cooling apparatus for an indoor sports facility according to another aspect of the present invention, the air supply-and-exhaust pipe is formed by a double pipe which is made up of an internal pipe corresponding to the supply pipe and an external pipe corresponding to the exhaust pipe. Therefore, in addition to the above described advantages, the piping becomes compact, and simultaneously, the double pipe helps the exhaust air to heat the supply air and the supply air to cool the exhaust air. Thereby, the cost of the heating can be lowered, and the melting of the ice can be slowed.

In the dehumidification cooling apparatus for an indoor sports facility according to still another aspect of the present invention, the external pipe includes an opening portion which opens in an upper part of the ice chamber, and a plurality of opening portions which are disposed a predetermined distance apart from each other in the upper space of the indoor sports facility. On the other hand, the internal pipe includes an opening portion which penetrates the external pipe in the ice chamber, protrudes outward from the external pipe and opens in a lower part of the ice chamber, and a plurality of opening portions which penetrate the external pipe in the upper space of the indoor sports facility, protrudes outward from the external pipe and are disposed at a predetermined distance apart from the opening portions of the external pipe. Therefore, in addition to the above described advantages, the coldest air in the ice chamber's lower part can be taken into the internal pipe. Then, the cold air to be supplied is supplied from the plurality of opening portions in the upper space of the indoor sports facility, so that the cooling efficiency becomes higher. At the same time, the indoor sports facility's space is slowly cooled, thus helping prevent fog, dew or frost from forming.

In the dehumidification cooling apparatus for an indoor sports facility according to still another aspect of the present invention, the opening portions of the external pipe disposed in the upper space of the indoor sports facility open downwardly, and the opening portions of the internal pipe disposed in the upper space of the indoor sports facility open horizontally. Therefore, in addition to the above described advantages, the air at a relatively high temperature in the indoor sports facility can be swiftly discharged. Simultaneously, the cold air to be supplied is supplied horizontally from the upper space of the indoor sports facility. Thereby, it goes down slowly, so that fog, dew or frost can be prevented from forming.

In the dehumidification cooling apparatus for an indoor sports facility according to still another aspect of the present invention, the ice chamber includes an outdoor-air intake which is freely opened and closed. Therefore, in addition to the above described advantages, this outdoor-air intake is closed at the time of dehumidification and cooling, thus helping heighten the dehumidification and cooling effects.

In the dehumidification cooling apparatus for an indoor sports facility according to still another aspect of the present invention, the ice chamber includes a plurality of water tanks which store water, and a shelf for placing the plurality of water tanks in a plurality of tiers. Therefore, in addition to the above described advantages, a large quantity of water can be efficiently turned into ice. Simultaneously, water can be easily supplied, and the melting heat of such massive ice is absorbed, thus making it possible to cool a great volume of air.

BRIEF DESCRIPTION OF THE DRAWINGS

FIG. 2A is a front view of an air supply-and-exhaust pipe according to the present invention, showing its operation in the warm season. FIG. 2B is a side longitudinal-sectional view of the air supply-and-exhaust pipe according to the present invention, showing its operation in the warm season. FIG. 2C is a front view of the air supply-and-exhaust pipe according to the present invention, showing its operation in the cold season. FIG. 2D is a side longitudinal-sectional view of the air supply-and-exhaust pipe according to the present invention, showing its operation in the cold season.

FIG. 3 is a side longitudinal-sectional view of the dehumidification cooling apparatus for an indoor sports facility according to the present invention, showing an air flow in the warm season.

FIG. 4 is a front longitudinal-sectional view of the indoor sports facility, showing an air flow supplied in the warm season by a humidification heating apparatus for an indoor sports facility according to the present invention, showing an air flow in the cold season.

DESCRIPTION OF THE PREFERRED EMBODIMENT

Figure 1:
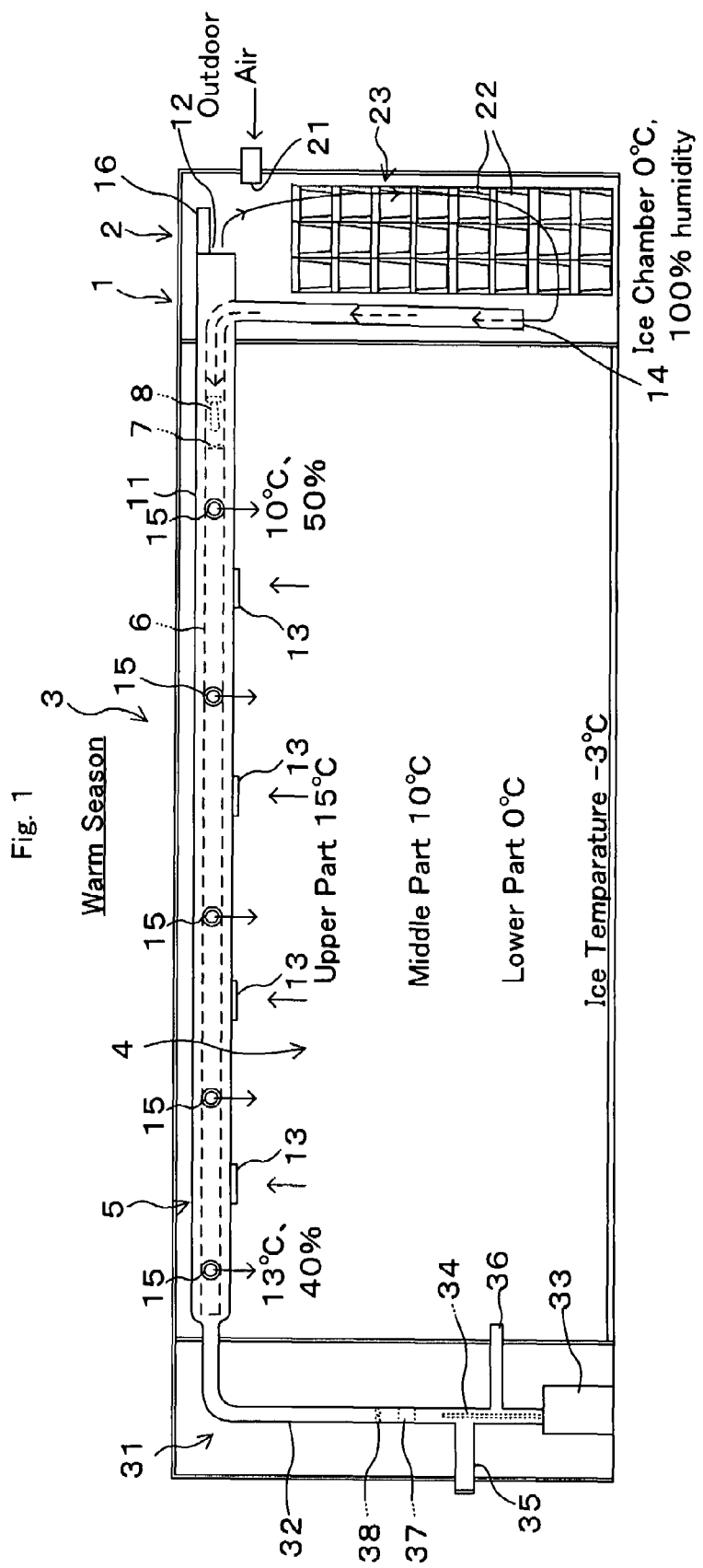
FIG. 1 is a front longitudinal-sectional view of an indoor sports facility, showing an air flow supplied in the warm season by a dehumidification cooling apparatus for an indoor sports facility according to the present invention.

Hereinafter, a dehumidification cooling apparatus for an indoor sports facility according to an embodiment of the present invention will be described with reference to the attached drawings showing a practical example.

In FIG. 1, reference numeral 1 denotes a dehumidification cooling apparatus for an indoor sports facility according to the present invention which is used in a warm season. The dehumidification cooling apparatus 1 for an indoor sports facility includes: an ice chamber 2 which turns water into ice and stores the ice; an air supply-and-exhaust pipe 5 which is disposed from the ice chamber 2 to an indoor sports facility 3, leads to the ice chamber 2 and leads to the upper part of an indoor sports-facility space 4; a fan 7 which is disposed in a supply pipe 6 of the air supply-and-exhaust pipe 5; and a heater 8 which is disposed at a predetermined distance apart from the fan 7 in the supply pipe 6 of the air supply-and-exhaust pipe 5.

The air supply-and-exhaust pipe 5 is a double pipe which is made up of an internal pipe formed by the supply pipe 6 and an external pipe formed by an exhaust pipe 11. The exhaust pipe 11 includes an opening portion 12 which opens in the upper part of the ice chamber 2, and a plurality of opening portions 13, 13, . . . which are disposed at predetermined intervals in the upper part of the indoor sports-facility space 4. The supply pipe 6 includes: an opening portion 14 which penetrates the exhaust pipe 11 in the ice chamber 2, protrudes outward from the exhaust pipe 11 and opens in the lower part of the ice chamber 2; and a plurality of opening portions 15, 15, . . . which penetrate the exhaust pipe 11 in the upper part of the indoor sports-facility space 4, protrudes outward from the exhaust pipe 11 and are disposed separately at a predetermined distance from the opening portions 13 of the exhaust pipe 11. In the opening portion 12 of the exhaust pipe 11, a damper 16 is provided which opens and closes the opening portion 12. One end of the supply pipe 6, which is the end far away from the ice chamber 2, is closed.

The opening portions 13, 13, . . . of the exhaust pipe 11 disposed in the upper part of the indoor sports-facility space 4 open downwardly. On the other hand, the opening portions 15, 15, . . . of the supply pipe 6 disposed in the upper part of the indoor sports-facility space 4 open horizontally.

The ice chamber 2 includes an outdoor-air intake 21 which can be opened and closed. The ice chamber 2 is provided inside with a plurality of water tanks 22, 22, . . . which store water, and a shelf 23 for placing the plurality of water tanks 22, 22, . . . in a plurality of tiers. Each water tank 22 is provided with, for example, a brim portion (not shown) around its opening part. This brim portion is hooked on a hook portion of the shelf 23 which protrudes from its strut or shelf board, so that the water tanks 22 can be placed on the shelf 23.

The indoor sports facility 3 is simultaneously provided with a heating apparatus 31 for use in a cold season.

The heating apparatus 31 includes: a supply pipe 32 which leads to the exhaust pipe 11 of the air supply-and-exhaust pipe 5 in the above described dehumidification cooling apparatus 1; a hot-water supply unit 33 which is connected to the supply pipe 32; a hot-water heater 34 which circulates hot water in the hot-water supply unit 33 and has a heat-radiation function of heating supply air; an outdoor-air introduction pipe 35 which introduces outdoor air into the supply pipe 32; a suction pipe 36 which sucks in air from the indoor sports-facility space 4; a humidifier 37 which humidifies supply air inside of the supply pipe 32; and a fan 38 which blows inside of the supply pipe 32.

For example, at the time of an outdoor-air temperature of zero degrees Celsius or below in the cold season, the water stored in the water tanks of the ice chamber 2 is turned into ice, using the outdoor air which flows in through natural ventilation from the outdoor-air intake 21 and/or another outdoor-air intake which has been opened by means of detection by a sensor (not shown) or manual operation by a person. Incidentally, suitably, outdoor air may also be forcedly sent in, using a fan or the like.

From the cold season until the warm season, the manufactured ice is kept almost frozen inside of the ice chamber 2 which is thermally insulated.

Then, in the warm season, the damper 16 is pulled up to open the opening portion 12. With the outdoor-air intake 21, the outdoor-air introduction pipe 35 and the suction pipe 36 kept closed, using the fan 7, the air cooled with the melting heat of the ice in the ice chamber 2 is sucked in from the opening portion 14 of the supply pipe 6 in the ice chamber 2. Through the supply pipe 6, it is supplied to the upper part of the indoor sports-facility space 4 from the opening portions 15, 15, . . . of the supply pipe 6 which open in the upper part of the indoor sports-facility space 4. At the same time, using the heater 8, the air (at a humidity of substantially one hundred percent) to be supplied inside of the supply pipe 6 is heated to reduce its humidity to a predetermined level (e.g., approximately fifty percent).

In the meantime, as the fan 7 operates, the pressure inside of the ice chamber 2 becomes negative, and this negative pressure leads the inside of the exhaust pipe 11 to have a negative pressure. Thereby, the air of the upper part of the indoor sports-facility space 4 is sucked into the exhaust pipe 11 from the opening portions 13, 13, . . . of the exhaust pipe 11. Through the exhaust pipe 11, it returns to the ice chamber 2 from the opening portion 12 of the exhaust pipe 11.

In this way, the air circulates in the ice chamber 2 and the indoor sports-facility space 4, so that dehumidification and cooling are conducted in the indoor sports-facility space 4.

When the above described dehumidification and cooling are conducted, the inside of the ice chamber 2 is kept at a temperature of zero degrees Celsius and at a humidity of one hundred percent. In this state, for example, air at a temperature of ten degrees Celsius and a humidity of fifty percent is supplied from the opening portion 15 of the supply pipe 6 closest to the ice chamber 2. In contrast, from the opening portion 15 of the supply pipe 6 farthest away from the ice chamber 2, for example, air at a temperature of thirteen degrees Celsius and a humidity of forty percent is supplied. Therefore, the indoor sports-facility space 4 is dehumidified and cooled so that the temperatures of its upper part, middle part and lower part become, for example, fifteen, ten and zero degrees Celsius, respectively.

FIGS. 2A and 2B show a flow of air in the air supply-and-exhaust pipe 5 in the warm season.

From the supply pipe 6, the dehumidified air, for example, air at a temperature of ten degrees Celsius and a humidity of fifty percent, is supplied through the opening portions 15, 15, . . . horizontally to the upper part of the indoor sports-facility space 4. The supplied air has a relatively great specific gravity, and thus, it goes down slowly.

On the other hand, the air inside of the upper part of the indoor sports-facility space 4, which is comparatively warm and relatively small in specific gravity, flows into the exhaust pipe 11 from the opening portions 13, 13, . . . . Through the exhaust pipe 11, it flows toward the ice chamber 2.

FIG. 3 shows an air flow in the indoor sports-facility space 4. The air supplied from the opening portions 15, 15, of the supply pipe 6 is emitted horizontally to the upper part of the indoor sports-facility space 4. Then, it moves down near the outside of the indoor sports-facility space 4. On the other hand, the relatively warm air of the indoor sports-facility space 4 is pushed up to the upper part of the indoor sports-facility space 4. Then, it flows into the opening portions 13 of the exhaust pipe 11.

In addition, as shown in FIG. 4, in the cold season, the damper 16 is brought down to close the opening portion 12. With the outdoor-air intake 21 closed, the openings of the outdoor-air introduction pipe 35 and the suction pipe 36 are opened. Then, the hot-water supply unit 33 of the heating apparatus 31 is heated, and the warm water of the hot-water supply unit 33 is circulated around the hot-water heater 34.

Sequentially, the fan 38 is rotated, and thereby, outdoor air is introduced through the outdoor-air introduction pipe 35. Through the suction pipe 36, air is sucked in from the lower part of the indoor sports-facility space 4. This air is heated by the hot-water heater 34 and is humidified by the humidifier 37. Thereafter, it is supplied through the supply pipe 32 to the exhaust pipe 11, and from the opening portions 13, 13, . . . of the exhaust pipe 11, it blows to the upper part of the indoor sports-facility space 4.

The air blown from the opening portions 13, 13, . . . pushes down the relatively cold air of the indoor sports-facility space 4, which is sucked into the suction pipe 36.

In this way, the air of the indoor sports-facility space 4 circulates, so that humidification and heating are conducted in the indoor sports-facility space 4.

When the above described humidification and heating are conducted, from the opening portion 13 of the exhaust pipe 11 closest to the hot-water heater 34, air at a temperature of, for example, fifteen degrees Celsius is supplied. In contrast, from the opening portion 13 of the exhaust pipe 11 farthest away from the hot-water heater 34, for example, air at a temperature of twelve degrees Celsius is supplied. Therefore, the indoor sports-facility space 4 is heated, for example, so that the temperatures of its upper part, middle part and lower part become fifteen, ten and zero degrees Celsius, respectively.

What is claimed is:

1. A dehumidification cooling apparatus for an indoor sports facility, comprising:
    an ice chamber for turning water into ice and storing the ice;
    an air supply-and-exhaust pipe which is disposed from the ice chamber to the indoor sports facility, leads to the ice chamber and leads to an upper space of the indoor sports facility;
    a fan which is disposed in a supply pipe of the air supply-and-exhaust pipe;
    a heater which is disposed at a predetermined distance apart from the fan in the supply pipe of the air supply-and-exhaust pipe;
    the fan supplies air cooled with melting heat of ice made in the ice chamber, from the ice chamber through the supply pipe to the upper space of the indoor sports facility;
    the heater heats air inside of the supply pipe to reduce the humidity of the air to a predetermined level;
    through an exhaust pipe of the air supply-and-exhaust pipe, the air of the upper space of the indoor sports facility is returned for circulation to the ice chamber, so that dehumidification and cooling are conducted in the space of the indoor sports facility
    characterized in that the air supply-and-exhaust pipe is a double pipe which is made up of an internal pipe formed by the supply pipe and an external pipe formed by the exhaust pipe;
    the external pipe includes an opening portion which opens in an upper part of the ice chamber, and a plurality of opening portions which are disposed at a predetermined distance apart from each other in the upper space of the indoor sports facility and open downwardly at the bottom of the external pipe; and
    the internal pipe includes an opening portion which penetrates the external pipe in the ice chamber, protrudes outward from the external pipe and opens in a lower part of the ice chamber, and a plurality of opening portions which penetrate the external pipe, protrudes outward from the lateral side of the external pipe in the upper space of the indoor sports facility, are disposed at a predetermined distance apart from the opening portions of the external pipe and open horizontally.

2. The dehumidification cooling apparatus for an indoor sports facility according to claim 1 wherein the ice chamber includes an outdoor-air intake which is freely opened and closed.

3. The dehumidification cooling apparatus for an indoor sports facility according to claim 1 wherein the ice chamber includes a plurality of water tanks which store water, and a shelf for placing the plurality of water tanks in a plurality of tiers.

* * * * *